(12) United States Patent
Sane et al.

(10) Patent No.: US 10,678,731 B2
(45) Date of Patent: *Jun. 9, 2020

(54) DATA-CATEGORY SWITCH MODULE IN THE CONTROL PLANE FOR USE WITH INTERNET OF THINGS DEVICES

(71) Applicant: Dell Products, LP, Round Rock, TX (US)

(72) Inventors: Sanjay Sane, Fremont, CA (US); Krishnamurthy Subramanian, Saratoga, CA (US); Snigdhendu S. Mukhopadhyay, San Jose, CA (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,006

(22) Filed: Aug. 27, 2018

(65) Prior Publication Data

US 2018/0365186 A1 Dec. 20, 2018

Related U.S. Application Data

(63) Continuation of application No. 15/050,370, filed on Feb. 22, 2016, now Pat. No. 10,089,272.

(51) Int. Cl.
*G06F 13/40* (2006.01)
*G06F 13/16* (2006.01)
*G06F 21/62* (2013.01)

(52) U.S. Cl.
CPC ......... *G06F 13/4022* (2013.01); *G06F 13/16* (2013.01); *G06F 21/6254* (2013.01)

(58) Field of Classification Search
CPC ................ G06F 13/4022; G06F 21/6254
See application file for complete search history.

(56) References Cited

U.S. PATENT DOCUMENTS

| 9,811,686 B1* | 11/2017 | Marquardt | G06F 21/6245 |
| 2004/0199810 A1 | 10/2004 | Tarcea | |
| 2014/0195664 A1* | 7/2014 | Rahnama | H04W 4/70 709/223 |
| 2015/0002523 A1* | 1/2015 | Zeng | G06F 21/71 345/522 |
| 2019/0266131 A1* | 8/2019 | Hansen | G06F 16/1744 |

* cited by examiner

*Primary Examiner* — Farley Abad
(74) *Attorney, Agent, or Firm* — Prol Intellectual Property Law, PLLC; H. Kenneth Prol (57) ABSTRACT

An information handling system containing a data-category switch module operating in the control plane for the exchange of data between internet of things applications, including a computer memory, a processor operatively coupled to the computer memory executing code of a data-switch module operatively coupled to the computer memory and the processor, a data zone, operatively coupled to the processor, defined by one or more data types from sensors associated with the data zone by data content categories, one or more network interfaces assigned to the data zone by data-category switch module policy provisions for receiving and transmitting data associated with the data zone, and one or more zone-labeled datasets stored in the computer memory operatively coupled to the data-category switch module and assigned to the data zone, each of the zone-labeled datasets receiving data from the data zone and configured to execute a data-zone specific application.

20 Claims, 9 Drawing Sheets

DATA-CATEGORY SWITCH MODULE IN THE CONTROL PLANE FOR USE WITH INTERNET OF THINGS DEVICES

This application is a continuation of prior application Ser. No. 15/050,370, entitled "Data-Category Switch Module in the Control Plane for Use with Internet of Things Devices," filed on Feb. 22, 2016, which is assigned to the current assignee hereof and is incorporated herein by reference in its entirety.

FIELD OF THE DISCLOSURE

The present disclosure generally relates to information handling systems, and more particularly a data-category switch module in the control plane for use with computing devices such as internet of things devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, internet of things applications, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
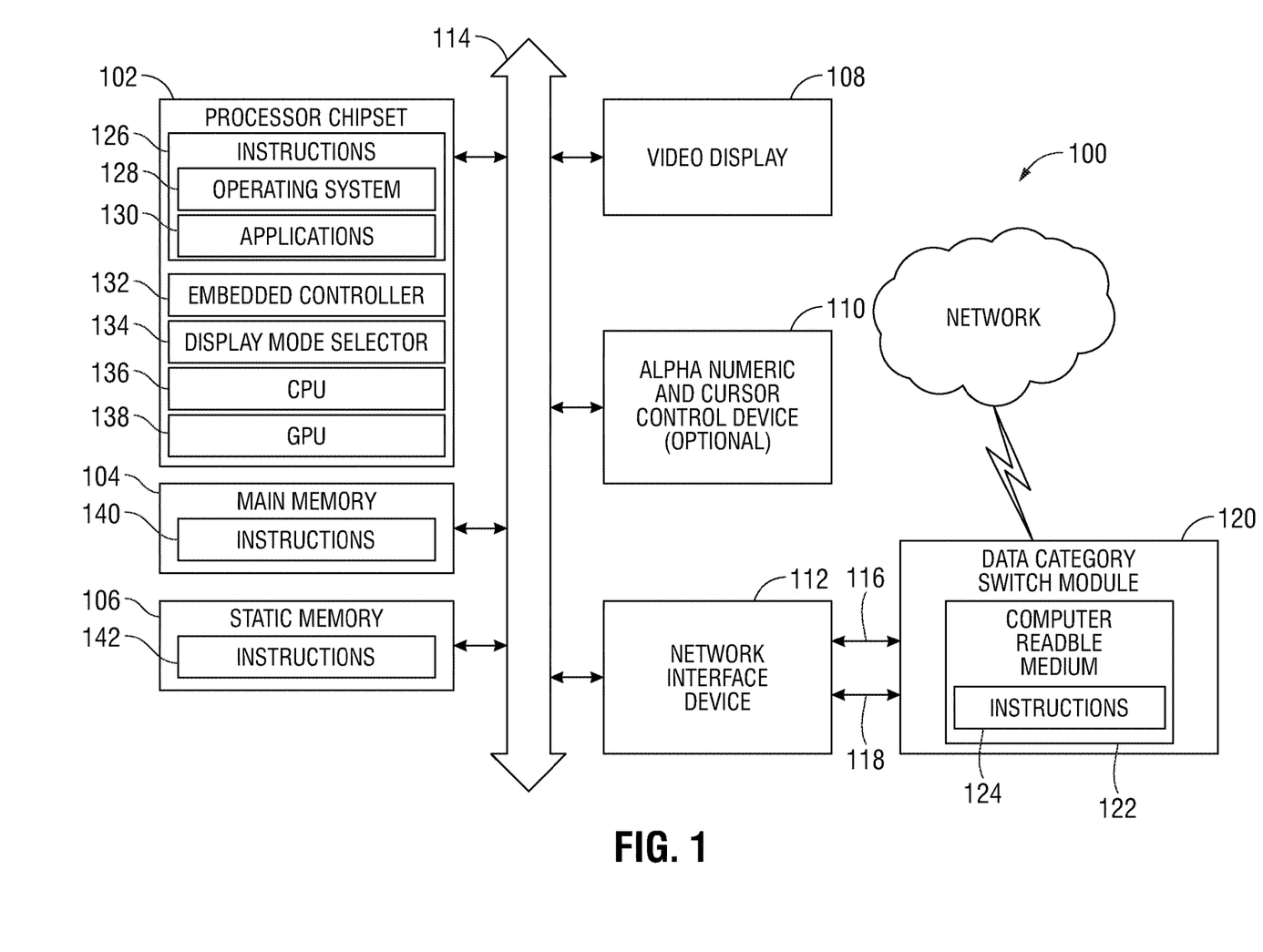
FIG. 1 shows a block diagram illustrating an information handling system according, to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes.

For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or modules described above, and operates to perform one or more of the methods described above. Information handling system 100 includes a processor chipset 102, a main memory 104, a static memory 106, a video display 108, an alpha numeric and cursor control device 110, and a network interface device 112. Processor chipset 102 is connected to main memory 104 and static memory 106 via a bus 114. An example of main memory 104 includes random access memory (RAM) such as static RAM (SRAM), dynamic RAM (DRAM), non-volatile RAM (NV-RAM), or the like, read only memory (ROM), another type of memory, or a combination thereof.

Network interface device 112 represents a NIC disposed within information handling system 100, on a main circuit board of the information handling system, integrated onto another component such as processor chipset 102, in another suitable location, or a combination thereof. Network interface device 112 includes network channels 116 and 118 that provide interfaces to devices that are external to information handling system 100. In a particular embodiment, network channels 116 and 118 are of a different type than bus 114 and network interface device 112 translates information from a format suitable to the bus 114 to a format suitable to external devices. An example of network channels 116 and 118 includes InfiniB and channels, Fibre Channel channels, Gigabit Ethernet channels, proprietary channel architectures, or a combination thereof. The network interface device 112 can include another information handling system, a data storage system, another network, a grid management system, another suitable resource, or a combination thereof.

Network channels 116 and 118 can be connected to external network resources may be connected to a data-switch module 120 that can also contain computer readable medium 122. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Figure 2:
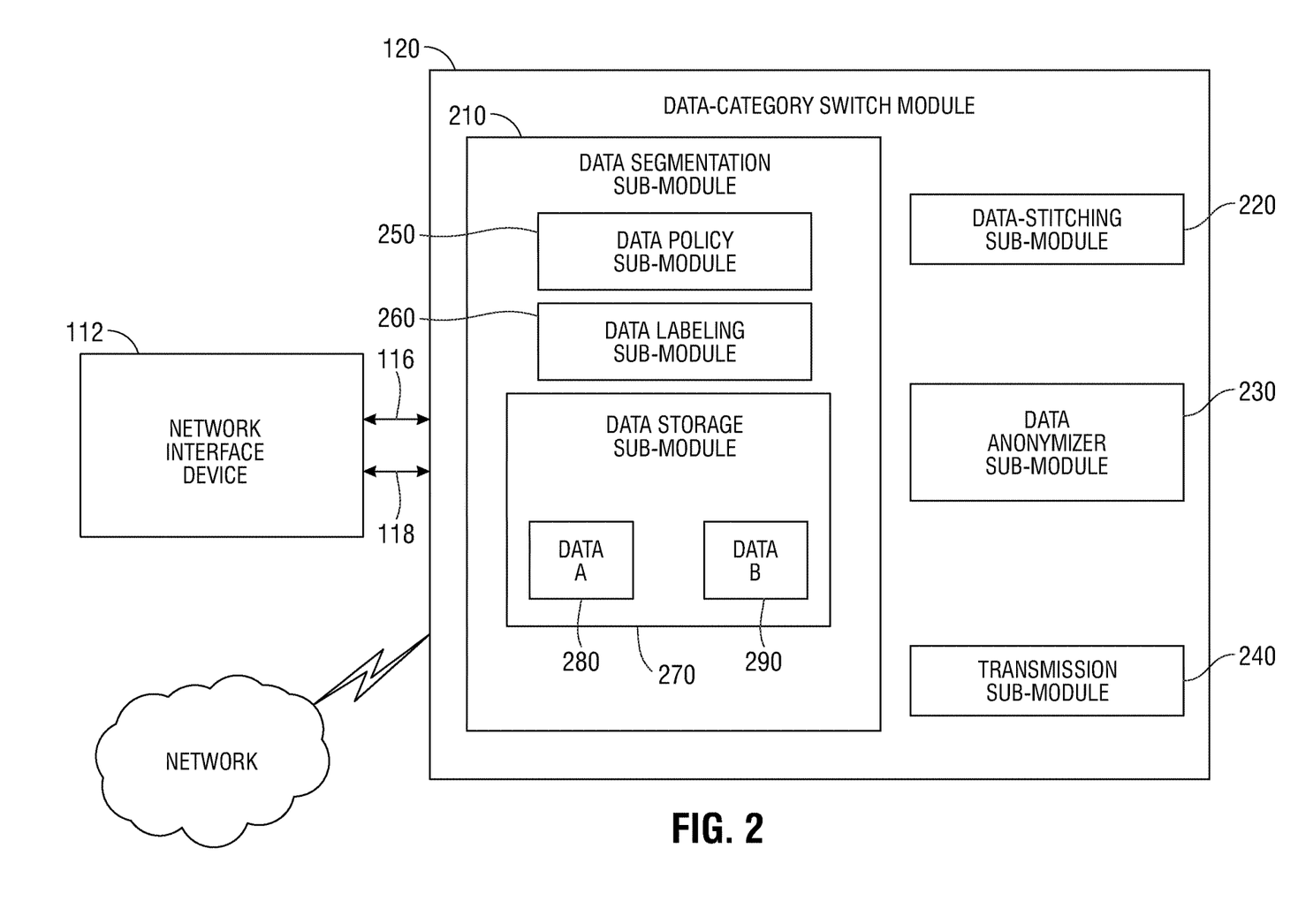
FIG. 2 shows a block diagram illustrating a data-switch module according to an embodiment of the present disclosure.

FIG. 2 shows a block diagram illustrating a data-switch module according to an embodiment of the present disclosure. The data-switch module 120 may be an API-based software structure that routes data between applications according to data-centric conditions. In an embodiment, the data-switch module may include a data segmentation sub-module 210, a data-stitching sub-module 220, a data anonymizer sub-module 230, and a transmission sub-module 240. Further, in an embodiment, the data segmentation sub-module 210 may include a data policy sub-module 250, a data labeling sub-module 260, and a data storage sub-module 270. The data storage sub-module 270 in an embodiment may include one or more datasets. For example, in FIG. 2, the data storage sub-module 270 includes Dataset A 280, and Dataset B, 290.

In an embodiment, the data segmentation sub-module may segment data of one or more types into one or more distinct datasets defined by the type of data stored therein, as described in greater detail below with reference to the example embodiments of FIGS. 3 and 4. For example, in an embodiment, the data segmentation sub-module 210 may separate temperature-related data it receives from a network interface from lighting-related data it receives from a separate network interface and save the temperature data in Dataset A and lighting data in Dataset B, as described below in greater detail with reference to the example embodiments of FIGS. 3 and 4.

The data-stitching sub-module in an embodiment may access and manipulate data stored in a Dataset within the data storage sub-module, as described in greater detail below with reference to the example embodiments of FIGS. 5 and 6. For example, the data-stitching sub-module 220 in an embodiment may access data stored in Dataset A 280 within the data storage sub-module 270, then perform a manipulation, such as a time-compaction service, on the data within Dataset A 280, as described in greater detail below with reference to the example embodiments of FIGS. 5 and 6.

The data anonymizer sub-module in an embodiment may access and manipulate data stored in a Dataset within the data storage sub-module, as described in greater detail below with reference to the example embodiments of FIGS. 7 and 8. For example, in an embodiment, the data anonymizer sub-module 230 may access data in Dataset A 280 stored in data storage sub-module 270, the perform a manipulation, such an anonymization service, on the data within Dataset A 280, as described in greater detail below with reference to the example embodiments of FIGS. 7 and 8.

The data transmission sub-module in an embodiment may access and transmit data from within a dataset stored within the data storage sub-module to one or more data-zone specific applications via one or more network interfaces, as described in greater detail below with reference to the example embodiments of FIGS. 3 and 8. For example, in an embodiment, the data transmission sub-module 240 in an embodiment may access and transmit data from Dataset A 280 within the data storage sub-module 270 to one or more data-zone specific applications via one or more network interfaces, as described in greater detail below with reference to the example embodiments of FIGS. 3 and 8.

The data labeling sub-module 260 in an embodiment may assign one or more network interfaces and one or more datasets stored in the data storage sub-module to one or more data-type specific data zones, as described in greater detail below with reference to the example embodiments of FIGS. 3, 4, 5, and 7. For example, in an embodiment, the data labeling sub-module 260 may assign a network interface (through which the data-category switch module 120 communicates with an external IOT application), and Dataset A 280 to one or more data zones, as described in greater detail below with reference to the example embodiments of FIGS. 3, 4, 5, and 7.

The data policy sub-module in an embodiment may create one or more data policy profiles, which may record the data zones assigned to one or more network interfaces by the data labeling sub-module, as described in greater detail below with reference to the example embodiments of FIGS. 3 and 4. For example, in an embodiment, the data policy sub-module 250 may record the data zones assigned to one or more network interfaces by the data labeling sub-module 260, as described in greater detail below with reference to the example embodiments of FIGS. 3 and 4. In an embodiment, the data policy profiles may also record information regarding transmission scheduling and/or data manipulation needed prior to transmission, as described in greater detail below with respect to FIGS. 5-8. For example, in an embodiment, the data policy profiles created by the data policy sub-module 250 may also record instructions for scheduling data transmission times, or for types of data manipulation (e.g. data-stitching and data anonymization) that may need to be performed prior to transmission, as described in greater detail below with respect to FIGS. 5-8. The data policy sub-module in an embodiment may also instruct the transmission module when to transmit data, as described in greater detail below with reference to the example embodiments of FIG. 9.

The data storage sub-module may create one or more datasets and store data within those datasets in an embodiment, as described in greater detail in FIGS. 3-8. For example, the data storage sub-module 270 in an embodiment may create Dataset A 280 and store data received via network interfaces assigned to the same data zone as Dataset A 280 in Dataset A 280, as described in greater detail below with reference to the example embodiments of FIGS. 3 and 4. As a further example, the data storage sub-module 270 in an embodiment may create a first manipulated dataset A and a second manipulated dataset A, and store data from Dataset A 280 that has been manipulated once in the first manipulated dataset A, and store data from Dataset A 280 that has been manipulated twice in the second manipulated dataset A, as described below in greater detail with reference to the example embodiments of FIGS. 5-8.

Separately, data switching manipulation may be applied to the Dataset B 290. The data storage sub-module 270 may store data received via network interfaces assigned to the same data zone as Dataset B 290 in Dataset B 290, as described in greater detail below with reference to the example embodiments of FIGS. 3 and 4. As a further example, the data storage sub-module 270 in an embodiment may create a first manipulated dataset B and a second manipulated dataset B, and store data from Dataset B 290 that has been manipulated once in the first manipulated dataset B, and store data from Dataset B 290 that has been manipulated twice in the second manipulated dataset B, as described below in greater detail with reference to the example embodiments of FIGS. 5-8.

Figure 3:
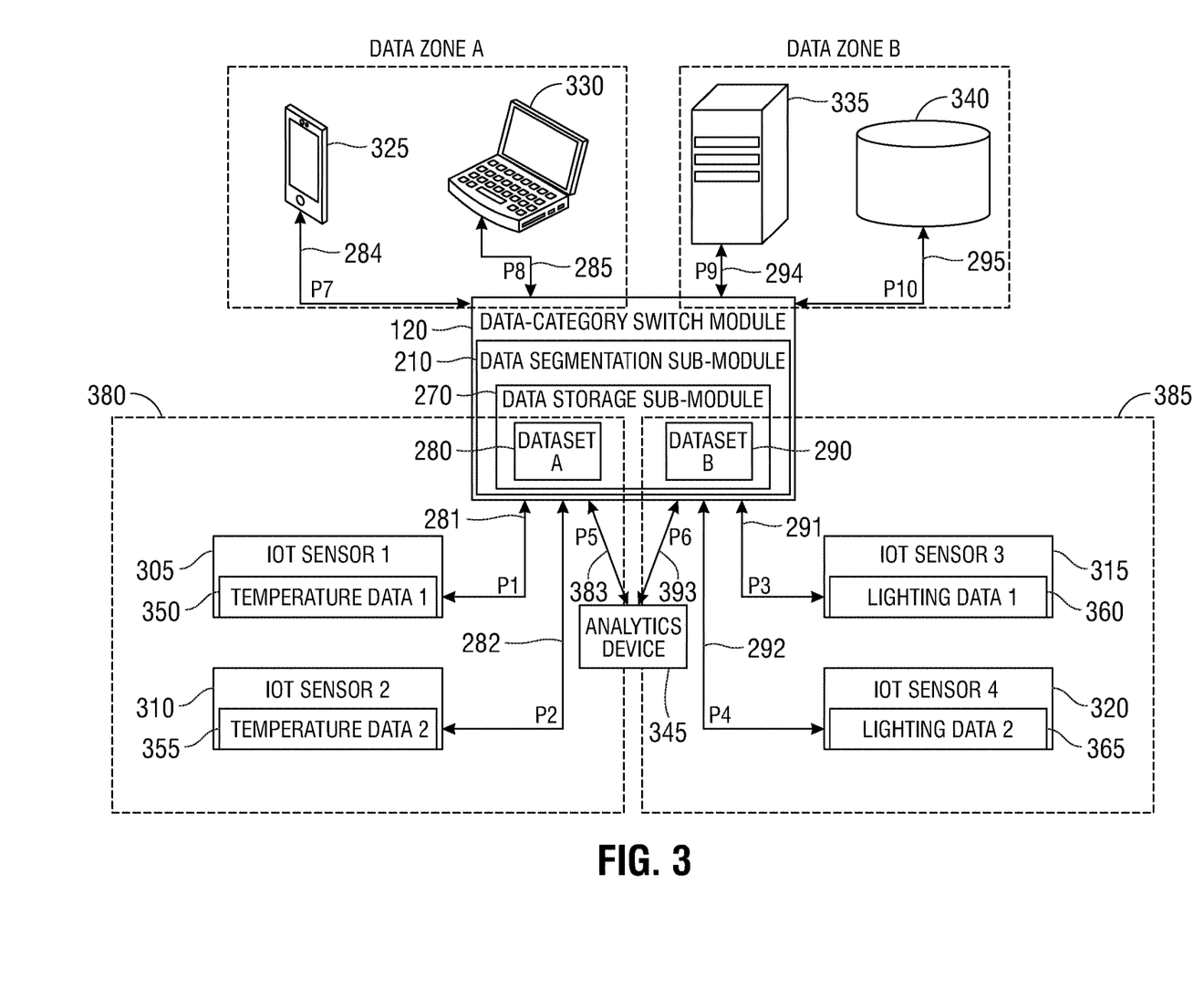
FIG. 3 shows a block diagram illustrating the data switching module connecting to IOT sensors and data-zone specific applications according to another embodiment of the present disclosure.

FIG. 3 shows a block diagram illustrating the data switching module connecting to IOT Sensors and data-zone specific applications via network interfaces according to an embodiment of the present disclosure. The data switching module 120 may connect to one or more data-zone specific applications operating on information handling systems, including IoT sensors, 305, 310, 315, 320, 325, 330, 335, 340, and 345 via one or more network interfaces P1-P10. Network interfaces 281(P1), 282(P2), 283(P5), 284(P7), and 285(P8) are shown as associated with Data Zone A 380. Network interfaces 291(P3), 292(P4), 293(P6), 294(P9), and 295(P10) are shown as associated with Data Zone B 385. In some example embodiments, an information handling system, such as analytics device 345 may be associated between a plurality of data zones such as both Data Zone A 380 and Data Zone B 385. In an embodiment, the network interfaces 281-285 and 291-295 (P1-P10) may be wired or wireless connections. In an embodiment, a network interface 281-285 and 291-295 (P1-P10) may include but not be limited to wireless cellular connections such as 4G and LTE networks, gigabit Ethernet connections, wireless internet connections (Wi-fi), and wired connections. The network connections 281-285 and 291-295 (P1-P10) may allow the data switching module 120 in an embodiment to interface with one or more IOT Sensors 305, 310, 315, and 320, or data-zone specific applications operating on information handling systems 325, 330, 335, and 345.

In an embodiment, the data-zone specific applications shown in FIG. 3 may reside within a device operatively coupled to the data switching module or to an external device such as one or more personal mobile devices 325 such as cell phones, smart phones, tablets, etc., one or more portable personal computers 330, one or more remote servers 335, including cloud servers, one or more remote storage devices 340, including cloud storage devices, and one or more analytics device information handling systems 345. Analytics device information handling systems 345 may be information handling systems operating software code instructions used to analyze IoT sensor data for a variety of purposes or to organize, correlate, or otherwise process the IoT data for use in applications operating on other information handling systems.

In an embodiment, the IOT Sensors 305-320 may gather and transmit different types of data. For example, in an embodiment, IOT Sensor 1 305 may gather and transmit temperature data 1 350 from one location, IOT Sensor 2 310 may gather and transmit temperature data 2 355 from a location separate from the location of IOT Sensor 1, IOT sensor 3 may gather and transmit lighting data 1 360 from one location, and IOT Sensor 4 may gather and transmit lighting data 2 365 from a location separate from the location of IOT sensor 3.

In an embodiment, the data segmentation sub-module may instruct the data labeling sub-module to define data zones. For example, as shown in FIG. 3, the data segmentation sub-module 210 may instruct the data labeling sub-module 210 to define Data zones A and B in an embodiment by the type of data received and transmitted via network interfaces 281-285 and 291-295 (P1-P10). For example, in an embodiment, the data labeling sub-module 210 may define a data zone A 380 to encompass all network interfaces through which the data switching module 120 receives and transmits temperature data (e.g., temperature data 1 350, and temperature data 2, 355), as discussed in greater detail below with reference to the example embodiments of FIG. 4. Similarly, in an embodiment, the data labeling sub-module 210 may also define a data zone B 385 to encompass all network interfaces through which the data switching module 120 receives and transmits lighting data (e.g. lighting data 1, 360, and lighting data 2, 365), as described in greater detail below with reference to the example embodiments of FIG. 4.

In an embodiment, the data segmentation sub-module may instruct the data labeling sub-module may also assign network interfaces from IOT Sensors and other data-zone specific applications to one or more data zones, as defined by data types. For example, as shown in FIG. 3, in an embodiment, the data segmentation sub-module 210 may instruct the data labeling sub-module 210 to assign network interfaces P1-P10 to one or more data zones, as defined by data types. In an embodiment, for example, the data labeling sub-module 260 may assign P1 (which may transmit data to and/or from IOT Sensor 1 305), P2 (which may transmit data to and/or from IOT Sensor 2 310), P7, (which may transmit data to and/or from the data-zone specific application residing within personal mobile device 325), P8, (which may transmit data to and/or from the data-zone specific application residing within portable personal computer 330), and P5, (which may transmit temperature-specific data to and/or from the data-zone specific application residing within analytics device 345) to Data Zone A 380, as described in further detail below with respect to FIG. 4. Similarly, the data labeling sub-module 210 in an embodiment may assign P3 (which may transmit data to and/or from IOT Sensor 3 315), P4 (which may transmit data to and/or from IOT Sensor 4 320), P9 (which may transmit data to and/or from the data-zone specific application residing within remote server 335), P10 (which may transmit data to and/or from the data-zone specific application residing within remote storage device 340), and P6 (which may transmit data to and/or from the data-zone specific application residing within analytics device 345) to Data Zone B 385, as described in more detail below with reference to FIG. 4. In an embodiment, the data-category switch module 120 may receive data via network interfaces assigned to specific data zones and the data segmentation sub-module may instruct the data storage sub-module to store that data in a dataset assigned to that same data zone. Dataset may be defined with respect to various content data categories. One or more data categories may then comprise a data zone such that switching by the data-category switch module executable code operating on an information handling system may switch data on the bases of these one or more data categories. In an example embodiment, a category of data content may comprise one or more of a type of sensor sending data, a type of application generating data, or a physical location of sensors generating data. For example, in an embodiment, the data-category switch module 120 may receive temperature data (e.g. temperature data 1 .50, temperature data 2, 355) via network interfaces P1, P2, P7, P8, and/or P5 from IOT sensors 305-310 or other data-zone A specific applications operating on information handling systems 325, 330, and/or 345 assigned to Data Zone A 380 and the data-segmentation module 210 may instruct the data storage sub-module 270 to store that temperature data in Dataset A 280, as described below in greater detail with respect to FIG. 4. Thus, the data-category switch module 120 may switch data on the basis of IoT sensor type, namely temperature sensors. Similarly, in an embodiment, the data-category switch module 120 may receive lighting data (e.g. lighting data 1 360, lighting data 2, 365) via network interfaces P3, P4, P9, P10, and/or P6 from IOT sensors 315-320 or other data-zone B specific applications operating on information handling systems 335, 340, and/or 345 assigned to Data Zone B 385 and the data segmentation sub-module 210 may instruct the data storage sub-module 270 to store said lighting data in Dataset B 290, as described below in greater detail with respect to FIG. 4. Similarly, the data-category switch module 120 may switch data on the basis of IoT sensor type, namely light sensors. Other content categories and combinations are contemplated as well for use with the embodiments of the present disclosure.

Figure 4:
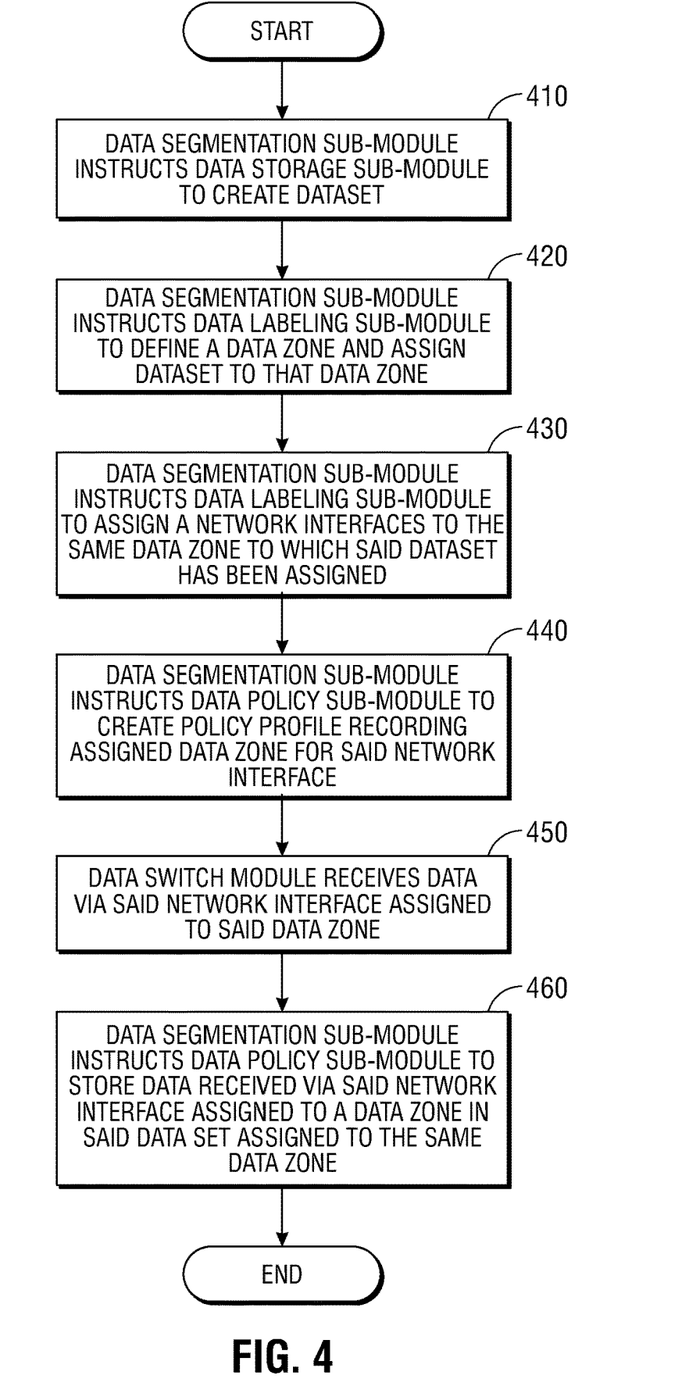
FIG. 4 shows a flow diagram illustrating a method of data segmentation according to an embodiment of the present disclosure.

FIG. 4 shows a flow diagram illustrating a method of data segmentation according to an embodiment of the present disclosure. In an embodiment, not every action associated with the method illustrated in FIG. 4 need be completed, the actions need not necessarily go in any specific order, and additional actions may take place as understood. In an embodiment, at block 410, the data segmentation sub-module may instruct the data storage sub-module to create a dataset. For example, in an embodiment, the data segmentation sub-module 210 may instruct the data storage sub-module 270 to create Dataset A 280 as discussed above in greater detail with reference to FIG. 3. Further, in another embodiment, the data segmentation sub-module 210 may instruct the data storage sub-module 270 to create Dataset B 290.

In an embodiment, at block 420 the data segmentation sub-module may instruct the data labeling sub-module to define a data zone and assign that dataset to a data zone. For example, in an embodiment, if the data received by the data-switching module 210 takes the tuple form {key, value}, and assuming "key" is a fine-width label, the data labeling sub-module 260 could define a data zone—Data Zone A 380—by attaching an additional label called "data zone" to the tuple using a simple command such as DATA ZONE::Data Zone A Dataset=Dataset A The data labeling sub-module in an embodiment could also use the above command to assign a dataset to a data zone, for example, assigning Dataset A 280 to Data Zone A

380, as described above in greater detail with reference to FIGS. 2 and 3. Similarly, the data labeling sub-module may assign other data sets to different data zones. For example, the data labeling sub-module may use a command to assign Dataset B 290 to Data Zone B 385.

In an embodiment, at block 430, the data segmentation sub-module may instruct the data labeling sub-module to assign a network interface to the same data zone to which the dataset has been assigned. For example, in an embodiment, the data segmentation sub-module 210 may instruct the data labeling sub-module 260 to assign a network interface P1 to the same data zone—Data Zone A—380 to which Dataset A 280 has been assigned, as described in further detail above with respect to FIGS. 2 and 3.

In an embodiment, at block 440, the data segmentation sub-module may instruct the data policy sub-module to create a policy profile recording the assigned data zone for said network interface. For example, in an embodiment, the data segmentation sub-module 210 may instruct the data policy sub-module 250 to create a policy profile recording the assigned data zone—Data Zone A 380—for network interface 281 (P1). This may similarly be done for Data Zone A 380 assigned to network interfaces 282 (P2), 283 (P5), 284 (P7), and 285 (P8). Policy profiles for network interfaces may further include transmission instructions, dictating, for example, times of scheduled transmissions and/or the type of data transmitted at scheduled times, as described below in greater detail with reference to the example embodiments of FIGS. 5-8. Data policy sub-module 250 may create policy profiles recording a plurality of assignments of data zones to establish data switching as well. In a further example embodiment, data segmentation sub-module 210 may instruct the data policy sub-module 250 to create a policy profile recording the assigned data zone—Data Zone B 385—for network interfaces 291-295 (P3, P4, P6, P9, and P10).

In an embodiment, at block 450, the data-category switch module may receive data via said network interface assigned to said data zone. For example, in an embodiment, the data-category switch module 120 may receive data via network interface P1 assigned to Data Zone A 380. In another embodiment, data-category switch module 120 may receive data via network interface P3 assigned to Data Zone B 385.

In an embodiment, at block 460, the data segmentation sub-module may instruct the data storage sub-module to store data received via said network interface assigned to a data zone in said data set assigned to the same data zone. For example, in an embodiment, the data segmentation sub-module 210 may instruct the data storage sub-module 270 to store the data received via 281 (P1), which is assigned to Data Zone A 380. The data received via 281 (P1) is stored in Dataset A 280, which is also assigned to Data Zone A 380. In another embodiment, the data segmentation sub-module 210 may instruct the data storage sub-module 270 to store the data received via 291 (P3), which is assigned to Data Zone B 385. The data received via 291 (P3) may be stored in Dataset B 290, which is also assigned to Data Zone B 385. It is understood that this procedure may apply to a plurality of data zones assigned to any number of a plurality of network interfaces. In some embodiments, network interfaces may also be assigned to information handling systems that may reside in a plurality of data zones such as analytics device information handling system 345.

Figure 5:
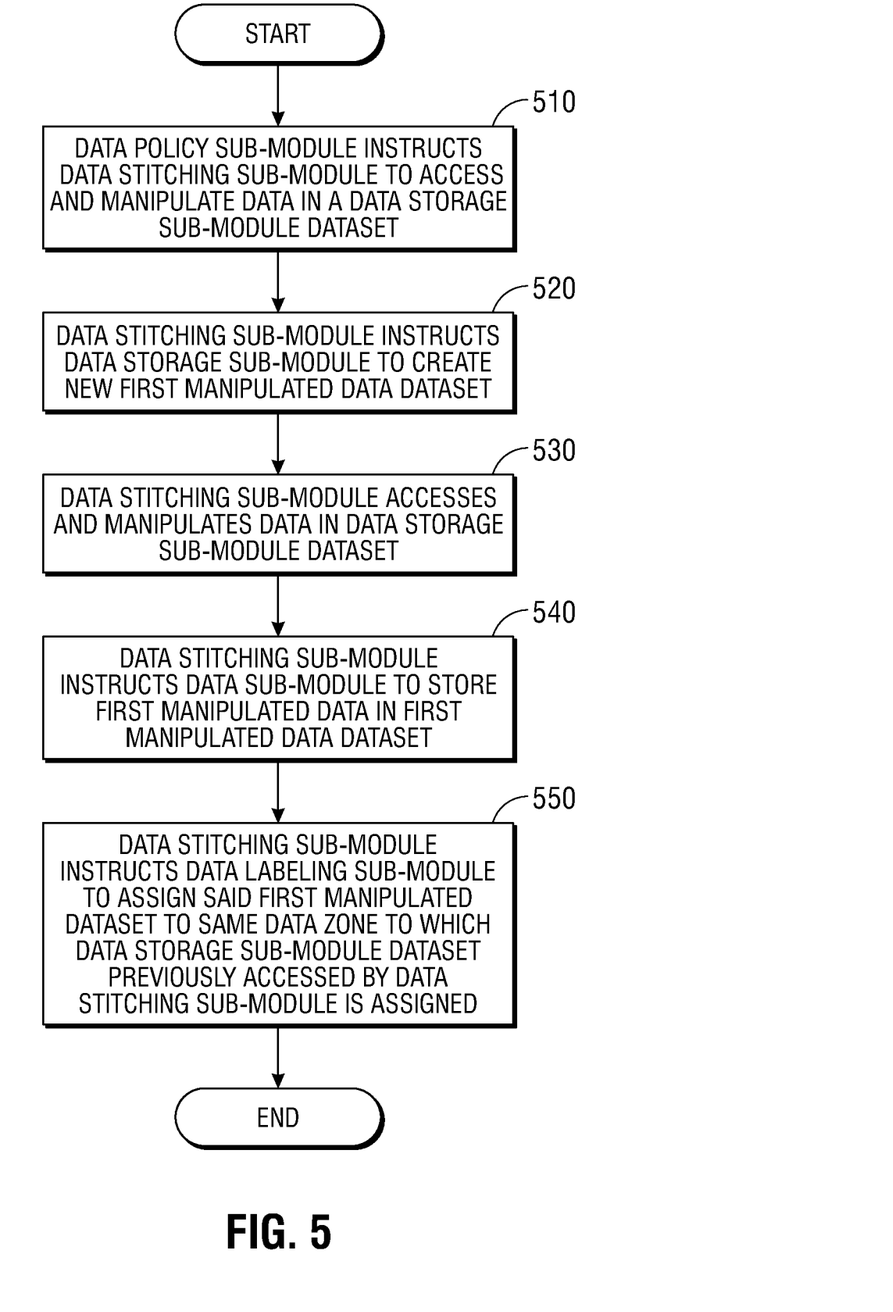
FIG. 5 shows a flow diagram illustrating a method of data stitching according to an embodiment of the present disclosure.

FIG. 5 shows a flow diagram illustrating a method of data stitching according to an embodiment of the present disclosure. In an embodiment, not every action associated with the method illustrated in FIG. 5 need be completed, the actions need not necessarily go in any specific order, and additional actions may take place as understood. At block 510 in an embodiment, the data policy sub-module may instruct the data-stitching sub-module to access and manipulate data in a data storage sub-module dataset. As described above with reference to FIG. 4, the data policy sub-module may have previously created a policy profile for a given network interface which may include transmission instructions, dictating, for example, times of scheduled transmissions and/or the type of data transmitted at scheduled times for a given network interface. For example, in an embodiment, the data policy sub-module 250 may instruct the data stitching sub-module 220 to access and perform a time-compaction service on data stored in Dataset A 380 in data storage sub-module 270, as described in greater detail below with respect to FIG. 6.

In an embodiment, at block 520, the data-stitching sub-module may instruct the data storage sub-module to create a new first manipulated dataset A. For example, in an embodiment, the data-stitching sub-module 220 may instruct the data storage sub-module 270 to create a first manipulated dataset, which is described in greater detail below with respect to FIG. 6.

In an embodiment, at block 530, the data-stitching sub-module may access and manipulate data in a data storage sub-module dataset. For example, tin an embodiment, he data-stitching sub-module 220 may access and perform a time compaction service on data in Dataset A 280 in data storage sub-module 270, as described in greater detail below with reference to the example embodiments of FIG. 6. It is understood the data-stitching sub-module 220 may, in an embodiment, manipulate the data it accesses from a dataset in any number of ways. As an example, these different data-stitching methods may include, but are not limited to time-compaction, and data-translation.

In an embodiment, at block 540, the data-stitching sub-module may instruct the data storage sub-module to store the first manipulated data in the newly created first manipulated data dataset. For example, in an embodiment, the data-stitching sub-module 220 may instruct the data storage sub-module 270 to store the time-compacted data in the recently created first manipulated dataset A, as described in greater detail below with respect to FIG. 6.

In an embodiment, at block 550, the data-stitching sub-module may instruct the data labeling sub-module to assign the first manipulated dataset to the same data zone to which the data storage sub-module dataset previously accessed by the data-stitching sub-module is assigned. For example, in an embodiment, the data-stitching sub-module 220 may instruct the data labeling sub-module 260 to assign the first manipulated Dataset A to Datazone A 380, the same data zone to which the data storage sub-module 270 dataset previously accessed by the data-stitching sub-module 220—Dataset A 280—is also assigned, as is described above in greater detail with respect to FIGS. 3 and 4.

Figure 6:
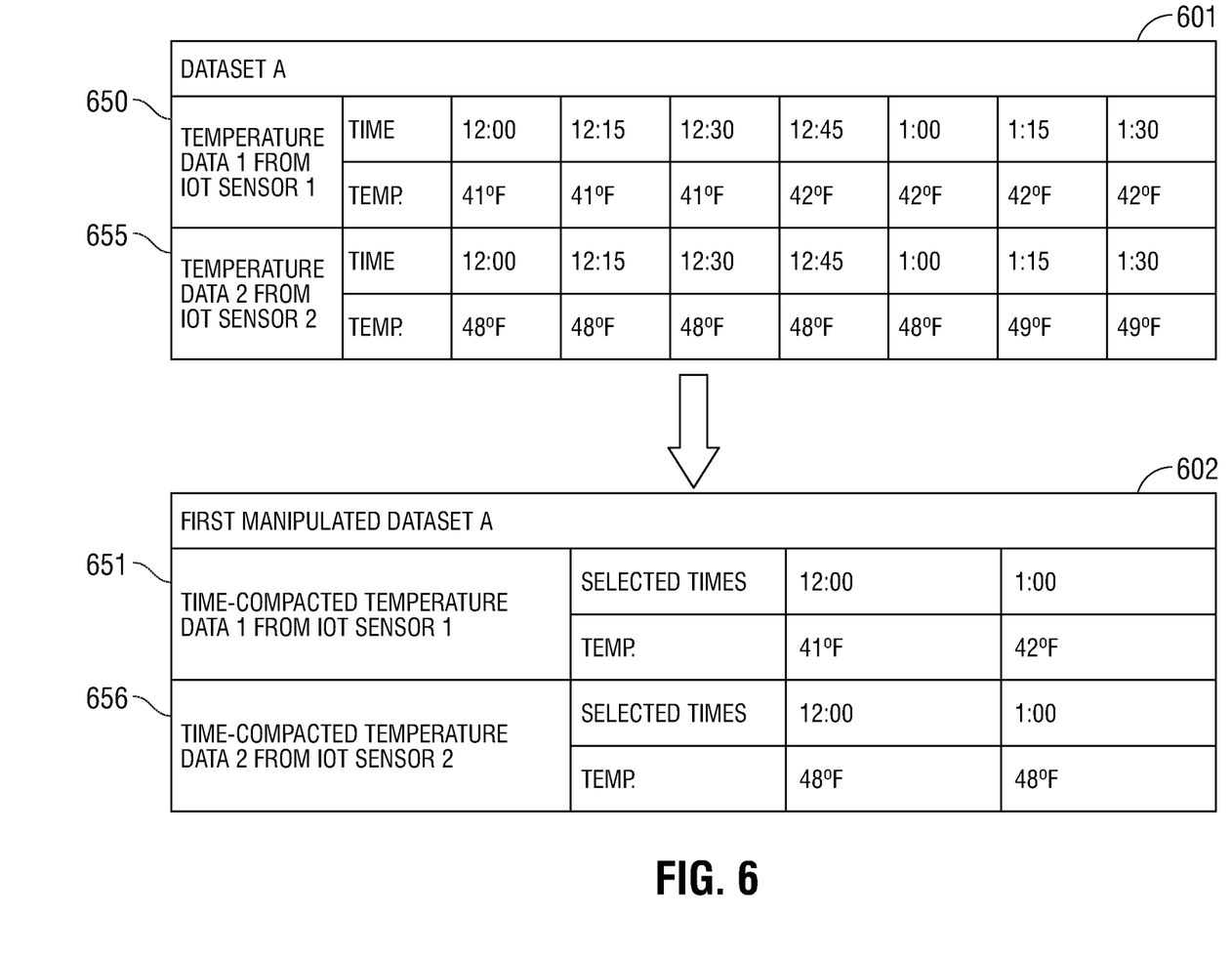
FIG. 6 shows a block diagram illustrating data-stitching involving time-compaction in an embodiment of the present invention.

FIG. 6 shows an illustration of data-stitching involving time-compaction in an embodiment of the present invention. As described above with reference to FIG. 5, it is understood the data-stitching method may involve a number of different types of data manipulation including, but not limited to time-compaction, and data-translation. A time compaction service may reduce the number of time-related data elements by eliminating unnecessary, redundant, or irrelevant elements. FIG. 6 shows a block diagram of a non-compacted temperature dataset 601 and a time-compacted temperature dataset 602 according to an embodiment of the present disclosure. For example, in an embodiment, the IOT Sensor 1, such as 305 in FIG. 3, may have recorded a temperature of 41 degrees Fahrenheit at 12:00 AM, and stored that time and temperature data in Temperature Data 1, 650. Further, in an embodiment, the data switching module 120 may have received temperature data 1 650 from IOT Sensor 1, such as 305 in FIG. 3, via network interface P1 which is assigned to Data Zone A 380. In an embodiment, the data switching module 210 may have then stored Temperature Data 1 650 in dataset A 601, as shown in FIG. 6. Additionally, in an embodiment, the IOT Sensor 1, such as 305 in FIG. 3, may have continued to take temperature readings and store those readings in Temperature Data 1 650, showing a temperature of 41 degrees Fahrenheit at 12:15 AM, 41 degrees Fahrenheit at 12:30 AM, 42 degrees Fahrenheit at 12:45 AM, 42 degrees Fahrenheit at 1:00 AM, 42 degrees Fahrenheit at 1:15 AM, and 42 degrees Fahrenheit at 1:30 AM. The data switching module 120 in an embodiment may have received temperature data 1 650 from IOT Sensor 1 via network interface P1 immediately after each of these recordings. In an embodiment, the data switching module 210 may have then stored each of these temperature data 1 650 transmissions over time in dataset A 601, as shown in FIG. 6, in the top dataset.

In another embodiment, the IOT Sensor 2, such as 310 in FIG. 3, may have recorded a temperature of 48 degrees Fahrenheit at 12:00 AM, and stored that time and temperature data in Temperature Data 1, 655. Further, in an embodiment, the data switching module 120 may have received temperature data 2 655 from IOT Sensor 2, such as 310 in FIG. 3, via network interface P3 which is assigned to Data Zone A 385. In an embodiment, the data switching module 210 may have then stored Temperature Data 2 655 in dataset A 601, as shown in FIG. 6. Additionally, in an embodiment, the IOT Sensor 2, such as 310 in FIG. 3, may have continued to take temperature readings and store those readings in Temperature Data 2 655, showing a temperature of 48 degrees Fahrenheit at 12:15 AM, 48 degrees Fahrenheit at 12:30 AM, 48 degrees Fahrenheit at 12:45 AM, 48 degrees Fahrenheit at 1:00 AM, 49 degrees Fahrenheit at 1:15 AM, and 49 degrees Fahrenheit at 1:30 AM. The data switching module 120 in an embodiment may have received temperature data 2 655 from IOT Sensor 2 via network interface P3 immediately after each of these recordings. In an embodiment, the data switching module 210 may have then stored each of these temperature data 2 655 transmissions over time in dataset A 601, as shown in FIG. 6.

As described above with reference to FIG. 5, the data-stitching sub-module 220 may manipulate dataset A 601. As shown in FIG. 6, dataset A 601 may be manipulated by applying a time-compaction service, which reduces the number of time-related temperature readings by storing temperature readings once every hour, rather than four times every hour. This may be done due to relative stability of temperature recordings over time from the IoT temperature sensors such as 305 and 310 in FIG. 3. For example, as shown in FIG. 6, in an embodiment, the data-stitching sub-module 220 manipulates dataset A by removing columns for temperature readings that were taken between two hours (i.e. 12:15, 12:30, 12:45, 1:15, and 1:30) from IoT sensors such as 305 and 310 in FIG. 3, and then instructs the data storage sub-module 270 to store this manipulated data (recorded only at 12:00 and 1:00) in first manipulated dataset A 602, as shown in the bottom dataset in FIG. 6. Time compaction manipulation may be applied to 650 to yield time compacted temperature data 1 651 from IoT sensor 1. Time compaction manipulation may also be applied to 655 to yield time compacted temperature data 2 656 from IoT sensor 2. This type of compaction can be useful by decreasing the amount of data transmitted to temperature applications to only the amount of data needed. For example, in an embodiment, a person using a weather application may need to know the current temperature as measured within the last 15 minutes, but if that person were to view weather conditions for the previous day, he would likely only need to know the temperature every hour, or maybe every three hours. This type of compaction can also be useful because, in some cases, access to data needs to be serialized or scheduled so that one micro-service can access or process the data before its available to another micro-service.

Figure 7:
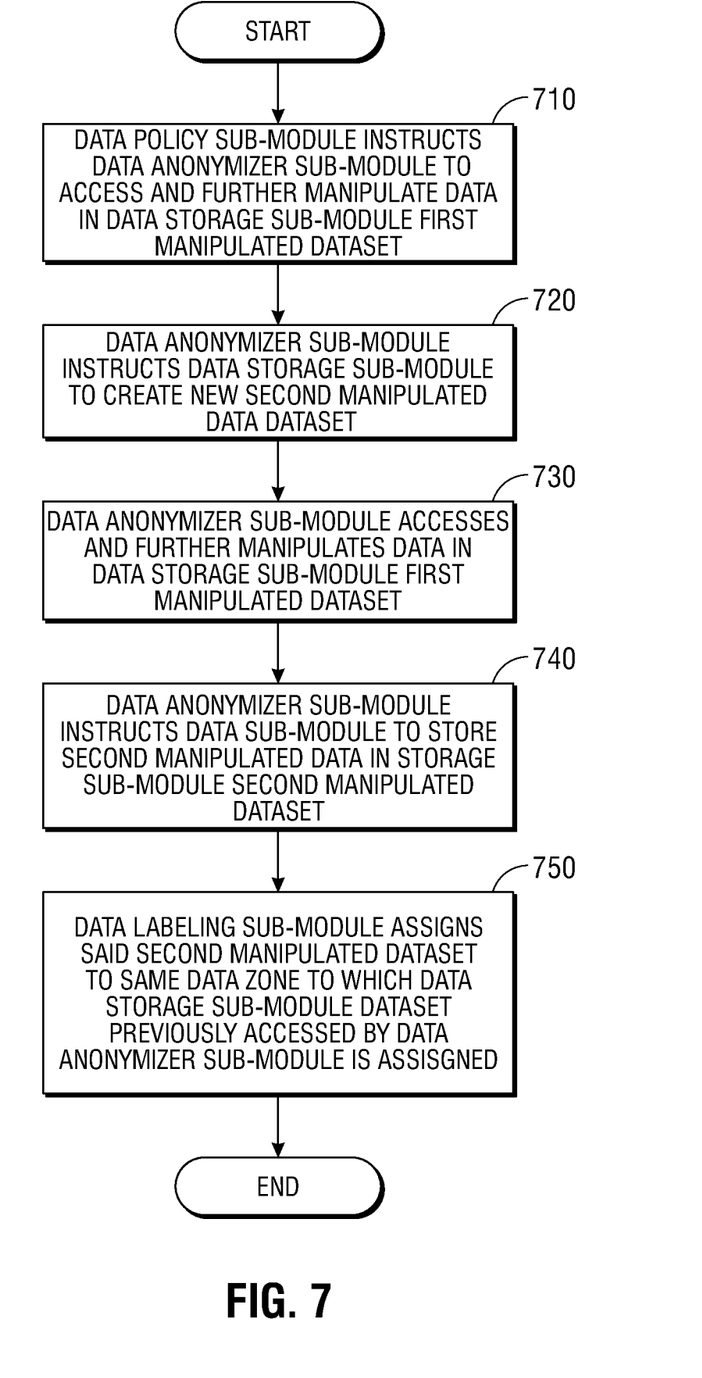
FIG. 7 shows a flow diagram illustrating a method of data anonymizing according to an embodiment of the present disclosure.

FIG. 7 shows a flow diagram illustrating a method of data anonymizing according to an embodiment of the present disclosure. In an embodiment, not every action associated with the method illustrated in FIG. 7 need be completed, the actions need not necessarily go in any specific order, and additional actions may take place as understood. In an embodiment, at block 710, the data policy sub-module may instruct the data anonymizer sub-module to access and further manipulate the first manipulated data in the data storage sub-module first manipulated dataset. For example, in an embodiment, the data policy sub-module 250 may instruct the data anonymizer sub-module 230 to access and perform an anonymizer service on the already time-compacted data in the first manipulated dataset A located in the data storage sub-module 270, as described in greater detail below with reference to the example embodiments of FIG. 8.

In an embodiment, at block 720, the data anonymizer sub-module may instruct the data storage sub-module to create a new second manipulated dataset. For example, in an embodiment, the data anonymizer sub-module 230 may instruct the data storage sub-module 270 to create a new second manipulated dataset A.

In an embodiment, at block 730, the data anonymizer sub-module may access and further manipulate data stored in the data storage sub-module first manipulated dataset. For example, in an embodiment, the data anonymizer sub-module 230 may access and perform an anonymizer service on the already time-compacted data stored in the first manipulated dataset A stored in the data storage sub-module 270, as described in greater detail below with reference to the example embodiments of FIG. 8.

In an embodiment, at block 740, the data anonymizer sub-module may instruct the data storage sub-module to store the second manipulated data in a second manipulated dataset in the storage sub-module. For example, in an embodiment, the data anonymizer sub-module 230 may instruct the data storage sub-module 270 to store the anonymized and time-compacted data in a second manipulated dataset A in the storage sub-module 270, as described in greater detail below with respect to FIG. 8.

In an embodiment, at block 750, the data labeling sub-module may assign the second manipulated dataset to the same data zone to which the data storage sub-module dataset previously accessed by the data anonymizer sub-module is assigned. For example, in an embodiment, the data labeling sub-module 260 may assign the second manipulated Dataset A to the same data zone—Data Zone A 380—to which the data storage sub-module dataset previously accessed by the data anonymizer sub-module 260—first manipulated Dataset A—is also assigned.

It is understood that, although FIGS. 5 and 7 describe the data-stitching sub-module 220 performing a first manipulation (time-compaction service) on data, then the data-anonymizer sub-module 230 performing a second manipulation (anonymizer) on the already manipulated data (previously time-compacted data), the data-stitching sub-module 220 and data-anonymizer sub-module 230 may perform these manipulations in any order, and any number of times. Further, the data-stitching sub-module 220 may perform multiple manipulations on data stored in a dataset without the data-anonymizer sub-module 230 performing any manipulations. Similarly, the data-anonymizer sub-module 230 may perform only a single manipulation on previously non-manipulated data stored in a dataset, or may perform multiple manipulations on data stored in a dataset without the data-stitching sub-module 220 performing any manipulations.

Figure 8:
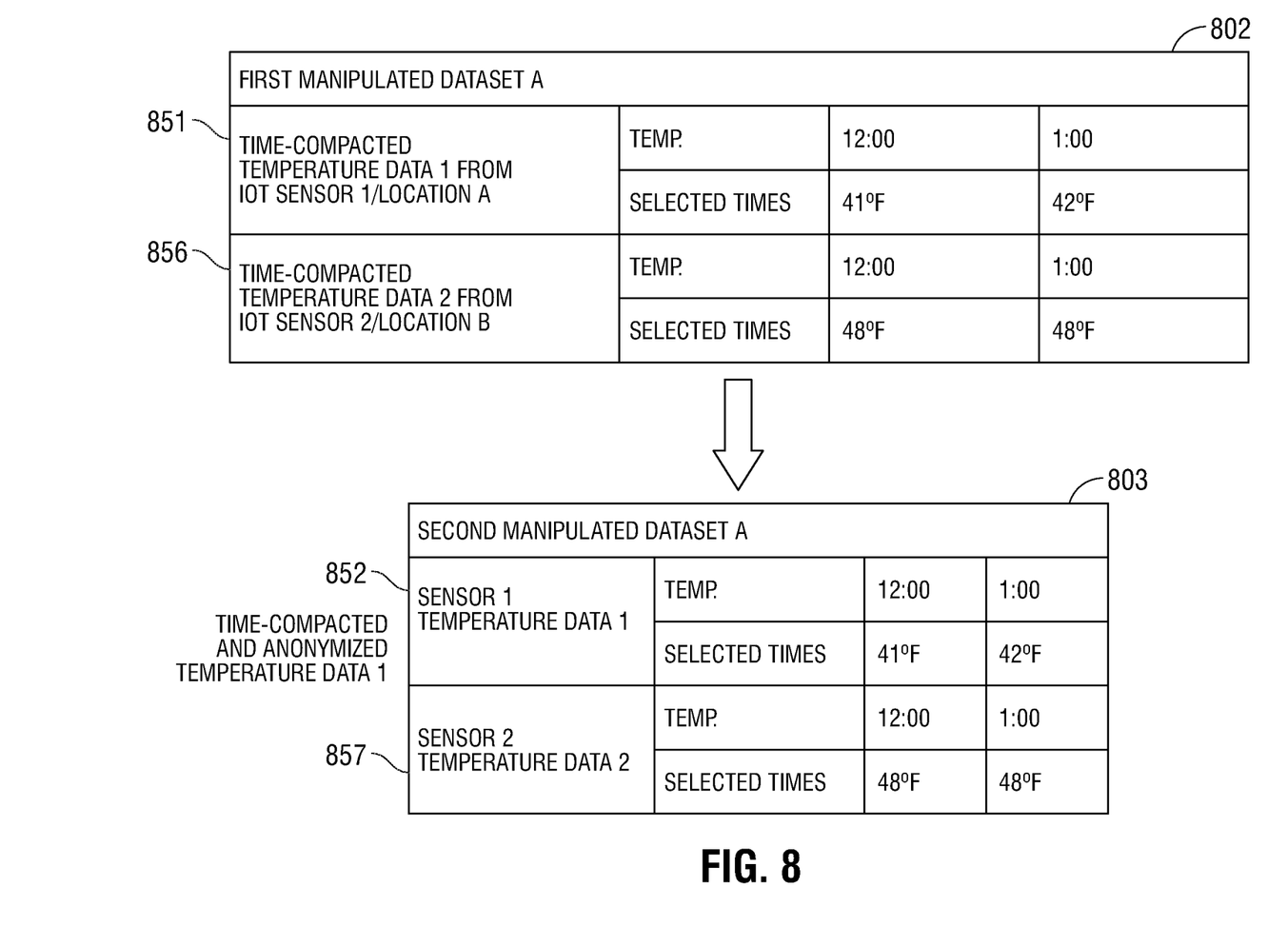
FIG. 8 shows a block diagram illustrating data anonymization in an embodiment of the present disclosure.

FIG. 8 shows an illustration of a data anonymization in an embodiment of the present disclosure. An anonymizer service may remove information that could identify the source of data before the data is transmitted from the data-switch module via a network interface. As discussed above with reference to FIGS. 5 and 6, the data-stitching sub-module 220 may have previously performed a time-compaction service on data stored in Dataset A, storing the time-compacted data in a first manipulated dataset A 802. In an example embodiment, first manipulated data set A 802 may have identifying data such as IoT device serial numbers, specific location source information, or other source identification information. FIG. 8 illustrates the data-anonymizer sub-module 230 performing a data anonymizer service on the data stored in the first manipulated dataset A in an embodiment. As shown in FIG. 8, in an embodiment, the first manipulated dataset A 802 may contain the names of the IOT Sensors (e.g., IOT Sensor 1 305 and IOT Sensor 2 310 as in FIG. 3) from which the data-switch module 120 received said temperature data (temperature data 1 350 and temperature data 2 355). The data-anonymizer sub-module 230 in an embodiment may further manipulate data stored in the first manipulated dataset A, by removing any information identifying the IOT Sensor from which the data switching module received temperature data 1, then instructing the data storage sub-module 270 to store the time-compacted and anonymized temperature data 1 852 in a second manipulated dataset A 803 that identifies the source of temperature data 1 as "location A" with an anonymous label such as "SENSOR 1" or source of temperature data 2 from "location B" stored as the time-compacted and anonymized temperature data 1 857 as "SENSOR 2" as shown FIG. 8, in the bottom dataset. In a further embodiment, the anonymizer could also remove any other types of identifying information, including string identifiers and IP addresses of applications, application interfaces, or other source identifying data associated with 851 and 856.

Figure 9:
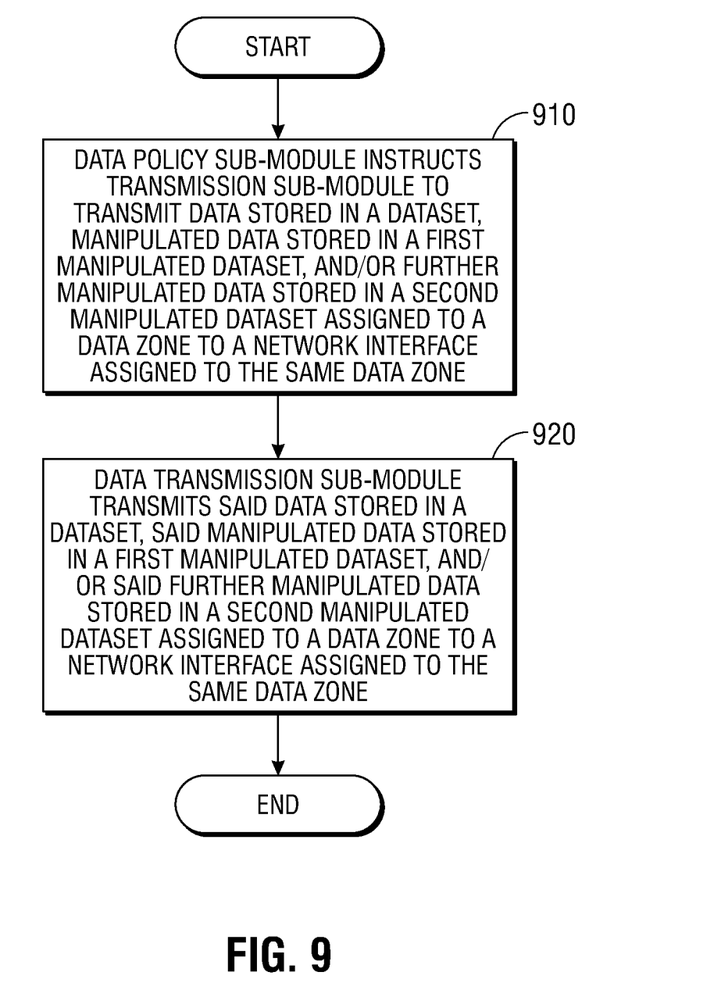
FIG. 9 shows a flow diagram of a method for transmitting data from the data storage sub-module to the data-zone specific applications via network interfaces, according to an embodiment of the present disclosure.

FIG. 9 shows a flow diagram of a method for transmitting data from the data storage sub-module to the data-zone specific applications via network interfaces, according to an embodiment of the present disclosure. At block 910, in an embodiment, the data policy sub-module may instruct the transmission sub-module to transmit data stored in a dataset, manipulated data stored in a first manipulated dataset, and/or further manipulated data stored in a second manipulated dataset assigned to a data zone via a network interface assigned to the same data zone. The transmission instructions for the transmission sub-module may be established according to a policy profile indicating which types of data should be sent to a network interface and other aspects of transmission of datasets correlated with datazones according to the present disclosure. For example, in an embodiment, the data policy sub-module 250 may instruct the transmission sub-module 240 to transmit temperature data 1 650 stored in dataset A 601, time-compacted temperature data 1 651 stored in first manipulated dataset A 602 as in the embodiment of FIG. 6, or time-compacted and anonymized temperature data 1 852 stored in second manipulated dataset A 803 as in the embodiment of FIG. 8, all of which are assigned to data zone A, to network interface P5 ?? which is also assigned to data zone A, as described in greater detail above with reference to the several example embodiments of FIGS. 3, 5, 6, 7, and 8.

As discussed above, in an embodiment, a policy profile may record which types of data should be sent to a network interface, the timing of said transmissions, and the types of manipulation that should be applied to data prior to transmission to a network interface. As such, the data policy sub-module may instruct the transmission sub-module to transmit data at scheduled times. The scheduled time may occur at any predetermined or preset time. For example, in an embodiment, the scheduled time may occur every time the data storage sub-module stores data from a particular IOT sensor. In other embodiments, data transmission schedule times may occur every time the data switching module receives a request from the network interface, on particular days of a month, or upon policy modifications such as modifications being made to the zone assignments of certain network interfaces.

In an embodiment at block 920, the transmission sub-module may transmit data stored in a dataset, manipulated data stored in a first manipulated dataset, and/or further manipulated data stored in a second manipulated dataset assigned to a data zone to a network interface assigned to the same data zone. For example, in an embodiment, the transmission sub-module 240 may transmit temperature data 1 650 stored in dataset A 601, time-compacted temperature data 1 651 stored in first manipulated dataset A 602 as in the embodiment of FIG. 6, or time-compacted and anonymized temperature data 1 852 stored in second manipulated dataset A 803 as in the embodiment of FIG. 8, all of which are assigned to data zone A, to network interface P5 which is also assigned to data zone A, as described in greater detail above with reference to example embodiments of FIGS. 3, 5, 6, 7, and 8.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a computer memory;
a processor operatively coupled to the computer memory executing code of a data-switch module;
the data-switch module defining a content type data zone, via a data labeling submodule, to generate one or more zone-labeled data sets for the content type data zone by labeling data based on a data content category of sensor-type data collected by a sensors type or generated by an application using the sensor-type collected data;

a network interface for receiving and transmitting data associated with the content type data zone and one or more zone-labeled datasets stored in the computer memory and assigned to the content type data zone, each of the zone-labeled datasets receiving data from the content type data zone; and a data-stitching sub-module of the data-switch module to access and manipulate data from a first zone-labeled data set and store the manipulated data in a first manipulated data set accessible at the network interface assigned to the same content type data zone as the first zone-labeled dataset.

2. The information handling system of claim 1, wherein the data-switch module transmits data from the one or more zone-labeled datasets via the one or more network interfaces assigned to the content type data zone to a remotely coupled information handling system.

3. The information handling system of claim 1 wherein the first manipulated dataset is accessible at scheduled times by one or more network interfaces assigned to the same content type data zone.

4. The information handling system of claim 1, further comprising:

a data anonymizing sub-module of the data-switch module which accesses data in one or more of said zone-labeled datasets, manipulates said data from said one or more of said zone-labeled datasets, and stores said manipulated data in a second manipulated dataset anonymized as to some information about sensors associated with the category of data content defining the content type data zone.

5. The information handling system of claim 1, wherein the sensors associated with the data content category of data are wireless IoT sensors collecting data on ambient conditions of the sensors and reporting the data content category of data to the information handling system.

6. The information handling system of claim 1, wherein said data-stitching sub-module applies time compaction services to generate the first manipulated dataset.

7. The information handling system of claim 1, further comprising:

a data anonymizing sub-module of the data-switch module to manipulate said data from said one or more of said zone-labeled datasets to remove source identifying information about the sensor generating the data content category of data for the one or more said zone-labeled datasets.

8. A computerized method for data category switching comprising:

executing code, via a processor operatively coupled to a computer memory, of a data-switch module;

defining a content type data zone, via the data-switch module, to generate one or more zone-labeled data sets by labeling data for the content type data zone sets based on a data content category of sensor-type data collected by a sensor type or generated by an application using the sensor-type collected data;

assigning a network interface to the content type data zone and receiving data content category of sensor-type data from the assigned network interface associated with the content type data zone by data-category switch module policy provisions; and storing and assigning a zone-labeled dataset for the data content category of sensor-type data received from the network interface assigned to the content type data zone, the zone-labeled dataset configured to execute a content type data-zone specific application.

9. The computerized method of claim 8, further comprising:

applying an anonymizer service, via one or more data anonymizing sub-modules of the data-switch module, to remove at least a portion of sensor-identifying information in one or more of said zone-labeled manipulated datasets; and generate a first manipulated dataset with anonymized data from the sensor-type data.

10. The computerized method of claim 9, wherein the sensors associated with the data content category of data are wireless IoT sensors collecting data on ambient conditions of the sensors and reporting the sensor-type data to the information handling system.

11. The computerized method of claim 8, further comprising:

manipulating sensor-type data, via one or more data-stitching sub-modules of the data-switch module, in one or more of said zone-labeled datasets to generate a first manipulated dataset.

12. The computerized method of claim 11, wherein said data-stitching sub-module applies one or more time compaction services.

13. The computerized method of claim 8, further comprising:

transmitting sensor-type data from the one or more zone-labeled datasets via the one or more network interfaces assigned to the data zone to a remotely coupled information handling system.

14. An information handling method comprising:

a processor operatively coupled to a computer memory executing code of a data-switch module;

a data labeling sub-module of the data-switch module defining a content type data zone defined by one or more content data types collected from sensor types detecting sensor type data associated with a sensor-type category of data content and labeling sensor-type data in the sensor-type category received from a sensor type detecting ambient conditions or generated by an application operating on the sensor-type data;

the data labeling sub-module assigning one or more network interfaces to the content type data zone by sensor-type data-category switch module policy provisions for receiving sensor-type data associated with the content type data zone and assigning one or more zone-labeled datasets to the content type data zone, wherein each of the zone-labeled datasets receives sensor-type data from the content type data zone and is configured to execute a data-zone specific application; and a data anonymizer submodule manipulating a zone-labeled dataset to remove identifying information for sources of the sensor-type data in the content type data zone and generating a manipulated dataset associated with the content type data zone without the identifying information.

15. The information handling method of claim 14, further comprising the data-switch module transmitting sensor-type data from the one or more manipulated datasets, via the one or more network interfaces assigned to the content type data zone, to a remotely coupled information handling system.

16. The information handling method of claim 14, wherein the data labeling sub-module assigns the manipulated data set to the content type data zone.

17. The information handling method of claim 14, further comprising:

one or more data-stitching sub-modules accessing manipulated sensor-type data in one or more of said manipulated datasets, further manipulating said manipulated sensor-type data from said one or more of said manipulated datasets, and storing one or more second manipulated datasets.

18. The information handling method of claim 17, wherein the data-stitching sub-module applies a time compaction service.

19. The information handling method of claim 14, wherein the sensors associated with the data content category of data are wireless IoT sensors collecting data on ambient conditions of the sensors and reporting the sensor-type data to the information handling system.

20. The information handling method of claim 14, wherein the manipulated dataset is accessible at scheduled times by one or more network interfaces assigned to the same content type data zone.

\* \* \* \* \*